United States Patent
Reiners

(10) Patent No.: US 7,061,711 B2
(45) Date of Patent: Jun. 13, 2006

(54) DETECTION OF A LOWER LIMIT OF TAPE HEAD TRAVEL IN A SINGLE REEL TAPE DRIVE

(75) Inventor: Doug Reiners, Frederick, CO (US)

(73) Assignee: Quantum Corporation, San Jose, CA (US)

( * ) Notice: Subject to any disclaimer, the term of this patent is extended or adjusted under 35 U.S.C. 154(b) by 595 days.

(21) Appl. No.: 10/292,671

(22) Filed: Nov. 12, 2002
(Under 37 CFR 1.47)

(65) Prior Publication Data
US 2004/0090697 A1    May 13, 2004

(51) Int. Cl.
*G11B 5/584*    (2006.01)
(52) U.S. Cl. .................................. 360/77.12
(58) Field of Classification Search ............. 360/77.12, 360/78.02, 251.1, 261.1, 75; 242/334.4, 242/324–327
See application file for complete search history.

(56) References Cited

U.S. PATENT DOCUMENTS 4,786,984 A * 11/1988 Seeman ....................... 360/31
6,257,514 B1    7/2001 Morris et al. ................ 242/332

* cited by examiner

*Primary Examiner*—David Hudspeth
*Assistant Examiner*—Mitchell Slavitt
(74) *Attorney, Agent, or Firm*—Morrison & Foerster LLP

(57) ABSTRACT

Detecting of a lower limit of tape head travel in a single reel tape drive discontinues signaling a tape head to move downward during initialization when the tape head as reach the lower limit of travel. Upon initialization, a processor steps the tape head housing to the lower limit of travel. A mechanical link at the bottom of the tape head engages a tape guide within a tape path and moves the tape guide away from the tape head. Movement of the tape guide pulls additional takeup leader from the takeup reel which rotates the guide rollers within the tape path. A tachometer coupled to one of the guide rollers within the tape path adjust a tachometer count which is monitored by the processor. In response to the change in the tachometer count, the processor discontinues stepping the tape head housing downward.

10 Claims, 4 Drawing Sheets

DETECTION OF A LOWER LIMIT OF TAPE HEAD TRAVEL IN A SINGLE REEL TAPE DRIVE

FILED OF THE INVENTION

This invention relates to digital tape drive storage systems, and in particular, to detecting the lower limit of a tape head travel in a single reel tape drive storage system.

PROBLEM

It is a problem in the field of digital tape drives to detect the lower limit of travel of a tape head without over driving the tape head in the downward direction when the tape drive is initialized. The tape head includes a post and gear assembly which rotates moving the tape head housing vertically following the direction of the post and gear assembly rotation. When a tape drive is initialized, the position of the tape head housing on the post and gear assembly is unknown.

The post and gear assembly rotation is actuated by a stepper motor which receives signals from a processor. Upon initialization, the processor signals the stepper motor to move the tape head housing downward a number of steps. However, it is unknown how many steps are required to step the tape head housing to a lower limit of travel. Therefore, additional steps are used. When the tape head housing reaches the lower limit of travel before the stepper motor discontinues stepping the tape head housing downward, the stepper motor "buzzes" until the steps are discontinued. Continuation of steps after the tape head housing has reached a bottom position results in a buzzing noise that is heard by the user. Users become uncomfortable when the tape drive emanates a buzzing noise for a period of time. Discontinuation of stepping the stepper motor when the tape head assembly reaches the lower limit of travel will decrease or eliminate the noise generated by the stepper motor. Discontinuing stepping of the tape head assembly when the tape head housing is in the bottom position also reduces the stress on the stepper motor and gear assembly.

For these reasons, a need exists for an apparatus and a method for detecting when a tape head assembly has reached a lower limit of travel when a tape drive is initialized.

SUMMARY

The present detection of a lower limit of tape head travel in a single reel tape drive overcomes the problems outlined above and advances the art by providing a method for detecting the lower limit of travel of a tape head assembly when a tape drive is initialized. The tape drive includes a tape head assembly for reading and writing data to and from tape media, a takeup up leader catch which holds the takeup leader for connection/disconnection with a tape cartridge leader, and a tape guide and guide rollers within a tape path.

The tape head assembly includes a post and gear assembly which rotates to move the tape head housing vertically up-and-down. When the tape drive is initialized the takeup leader which is routed following the tape path is secured in place by the takeup leader catch. A processor steps the tape head housing to the lower limit of travel. A mechanical link at the bottom of the tape head assembly engages the tape guide and moves the tape guide away from the tape head when the tape head assembly reaches the lower limit of travel. Movement of the tape guide pulls additional takeup leader from the takeup reel. Movement of the takeup leader within the tape path rotates the guide rollers. A tachometer coupled to one of the guide rollers within the tape path adjust a tachometer count which is monitored by the processor. In response to the change in the tachometer count, the processor discontinues stepping the tape head housing downward.

DETAILED DESCRIPTION

The tape head lower limit detection assembly summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Upon initialization, the control circuit signals the stepper motor to move the tape head housing downward a number of steps. However, it is unknown how many steps are required to step the tape head housing to the lower limit of travel. Therefore, additional steps are used. When the tape head housing reaches the lower limit before the stepper motor discontinues stepping the tape head housing downward, the stepper motor buzzes until the steps are discontinued. The buzzing noise is heard by users, and users become uncomfortable when the tape drive emanates a buzzing noise for a period of time. Discontinuation of stepping the stepper motor when the tape head assembly reaches the lower limit of travel decreases or eliminates the noise generated by the stepper motor. Discontinuing stepping also reduces the stress on the stepper motor and gear assembly.

Figure 1:
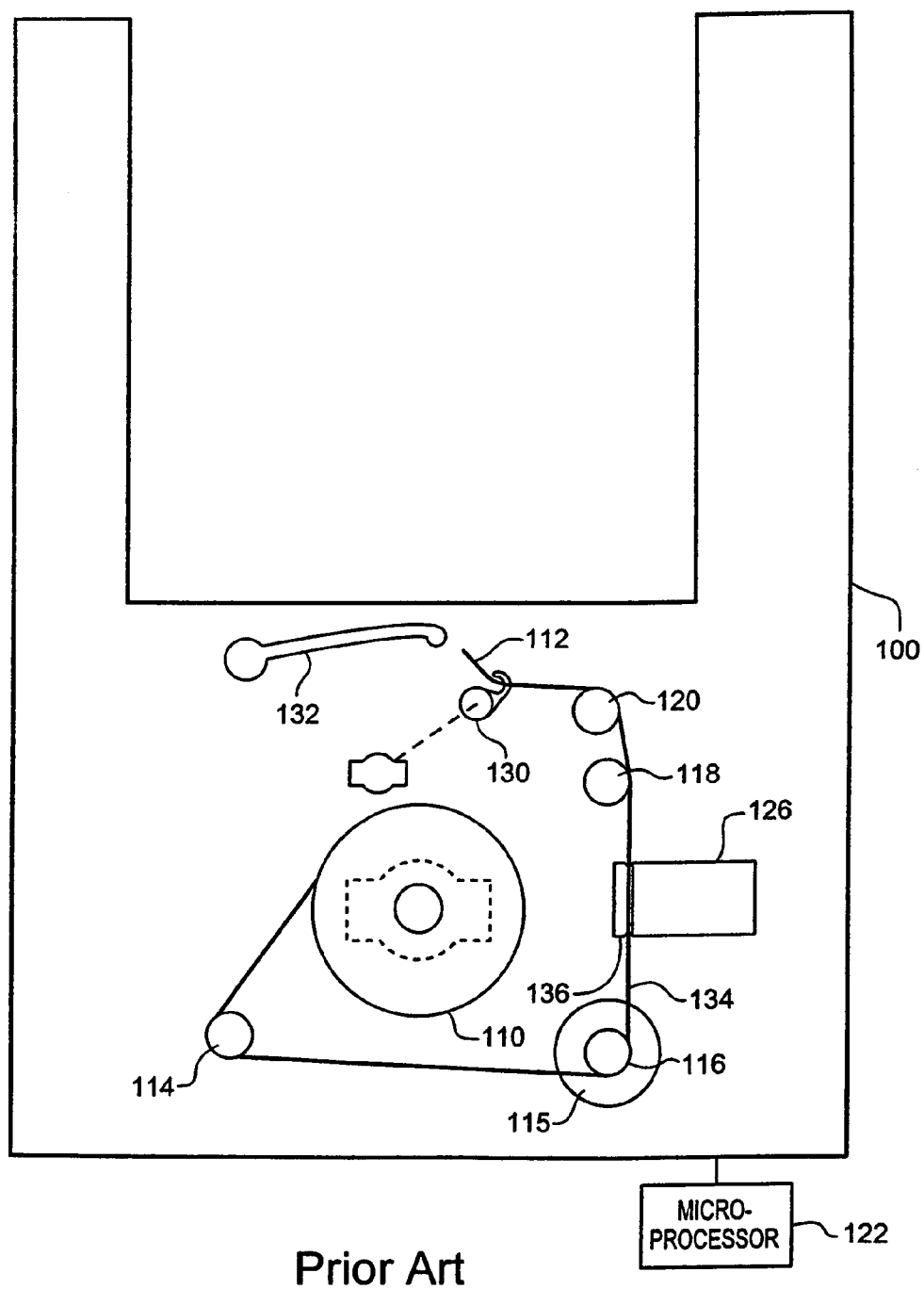
FIG. 1 illustrates a tape drive embodying the guiding assembly of the prior art.

Referring first to FIG. 1, operation of tape drive 100 is controlled by microprocessor 122, which is a conventional processor configured with software to operate in accord with the various embodiments of the present detection of a lower limit of tape head travel in a single reel tape drive. The software will be apparent to those skilled in the art in the context of the following discussion.

The operation of tape drive 100 includes three functions: the loading of magnetic tape media, the unloading of magnetic tape media, and the reading and writing of data from magnetic tape media. During the reading and writing of data, magnetic tape media from a tape cartridge (not illustrated) travels along tape path 134. Tape path 134 includes guide rollers 114, 116, 118, and 120, takeup leader catch 130, tape head 126, positioning lever 132, and tape guide 136. Tape guide roller 116 includes a tachometer 115 coupled to guide roller 116 for monitoring the movement of the tape media within tape path 134 by recording a tachometer count.

During initialization of the tape drive, the takeup leader is routed along tape path 134 between takeup reel 110 and a takeup leader catch 130 which holds the takeup leader for connection and disconnection with the tape cartridge leader.

During the reading and writing of data, magnetic tape media from a tape cartridge (not illustrated) travels along tape path 134 as tape head housing 126 reads and writes data from and to magnetic tape media as the magnetic tape media moves past tape head 126. When a tape cartridge is removed from the tape drive, the tape head 126 remains at the lateral position previously used to read/write data from/to the magnetic tape media. Therefore, when tape drive 100 is initialized, the lateral position of tape head 126 is not known. Upon initialization, processor 122 signals the stepper motor (not shown) to move tape head 126 downward a number of steps. However, it is unknown how many steps are required to step tape head 126 to the lower limit of travel. Therefore additional steps are used.

When tape head 126 reaches the lower limit of travel within tape drive 100 embodying a tape guide such as tape guide 136, tape guide 136 pivots away from tape head 126. As takeup leader 112 is moved away from tape head housing 126 by tape guide 136, takeup leader 112 tightens the takeup reel, resulting in an additional length of takeup leader being pulled from takeup reel 110. As the additional takeup leader moves within tape path 134, guide roller 116 rotates. In response to rotation of guide roller 116, the tachometer count is updated.

Figure 4:
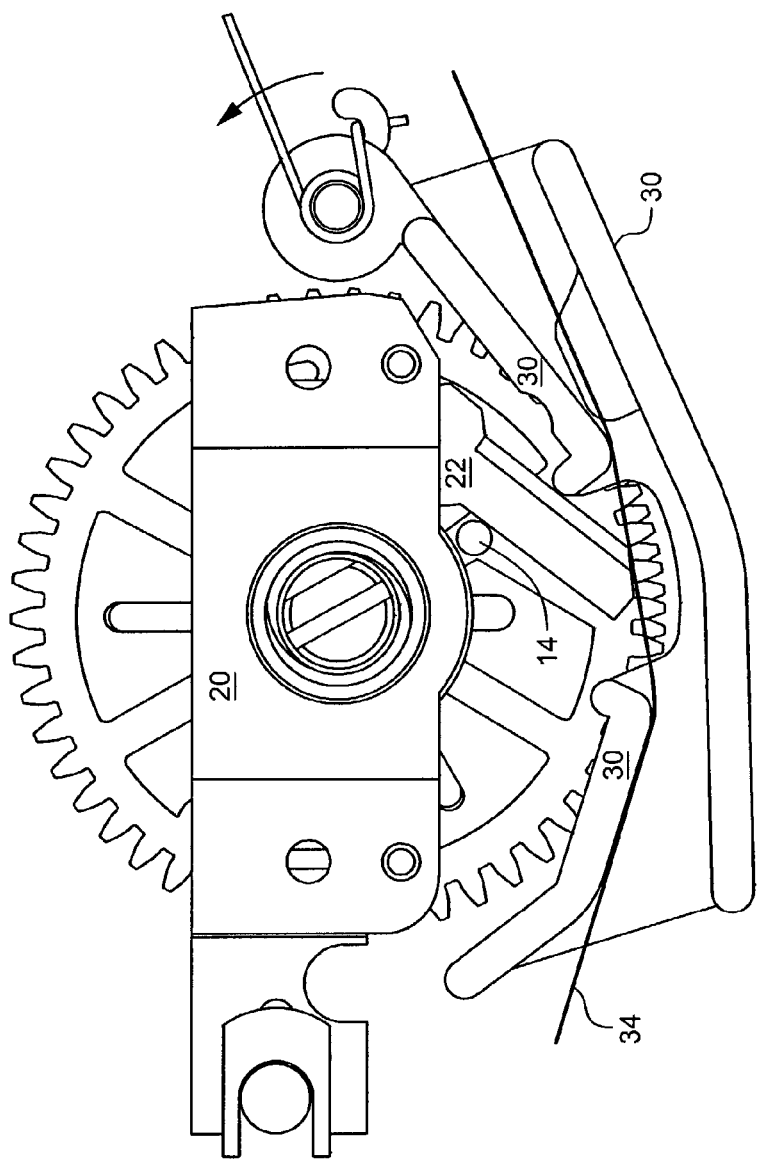
FIG. 4 illustrates a close up top view of the guiding assembly of the prior art in an engaged position.
Figure 2:
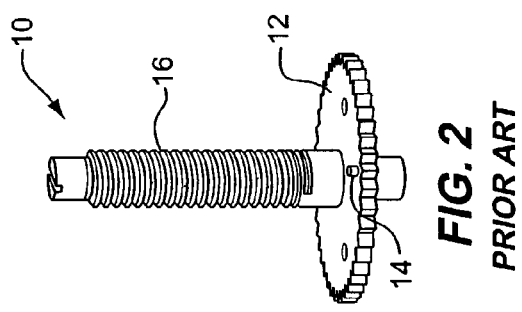
FIG. 2 illustrates a close up perspective of the post and gear assembly of the prior art.
Figure 3:
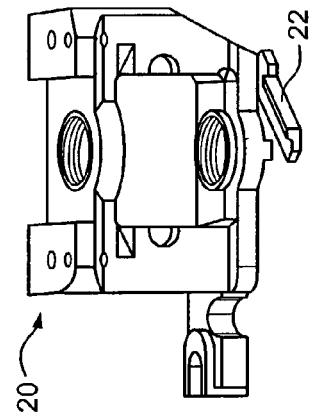
FIG. 3 illustrates a close up perspective of the tape head housing of the prior art.

Tape Media Guiding Assembly—FIGS. 1–4:

Known tape media guiding assemblies for protecting the tape head is disclosed by Willems (U.S. patent application Ser. No. 10/028,887) and Morris et al., (U.S. Pat. No. 6,257,514). In Willems and Morris, a tape guiding assembly pivotally connected to the tape drive within the tape path redefines the tape path during initialization, loading and unloading operations. The tape head assembly includes a post and gear assembly 10 (FIG. 2) and tape head housing 20 (FIG. 3). Cam bar 22 in Morris et al. is pivotally connected to the base of the tape head housing 20 as illustrated in FIGS. 3 and 4. As the tape head housing 20 approaches the bottom of the post and gear assembly 10 (the lower limit of travel), cam bar 22 engages a pin 14 formed on the surface of gear 12. As the post and gear 10 assembly continues to rotate, cam bar 22 pivots away from the tape head housing 20. When cam bar 22 pivots away from tape head housing 20, cam bar 22 engages tape guide 30 and pivots the tape guide 30 to an engaged position away from tape head housing 20.

While mechanical link for moving the tape guide assembly has been illustrated and described as a cam bar and corresponding pin that pivots the cam bar horizontally to move the tape guide away from the tape head although an alternative an alternative link, electrical or mechanical, may be substituted.

Figure 5:
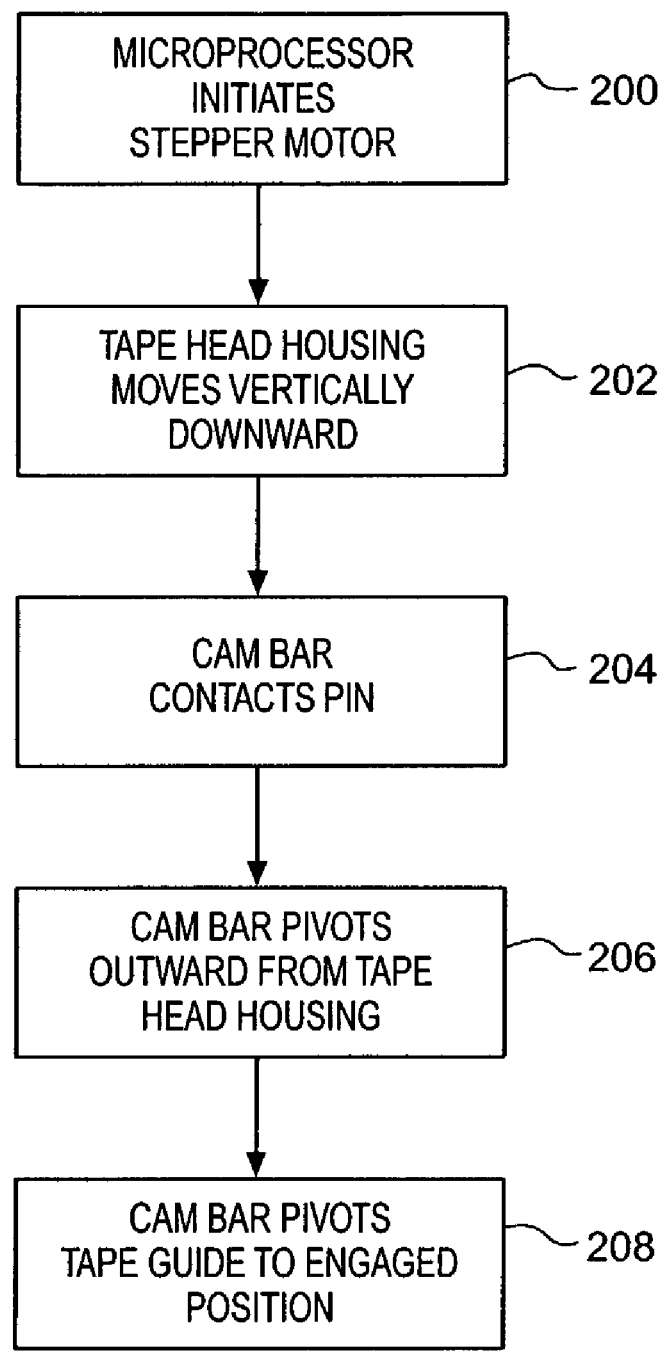
FIG. 5 is a flow diagram of the actuation of the guiding assembly of the prior art.
Figure 6:
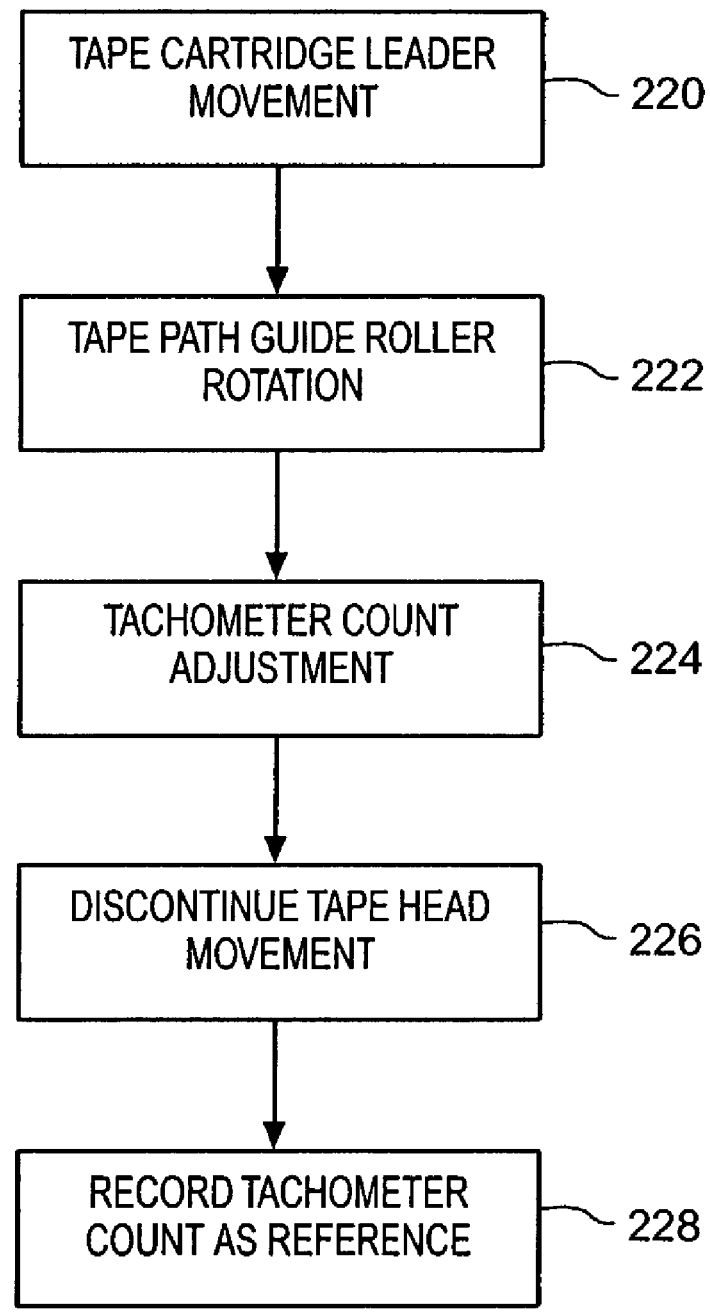
FIG. 6 is a flow diagram of the operation of the present detection of a lower limit of tape head travel in a single reel tape drive.

Operationally—FIGS. 5 and 6:

Referring back to FIG. 1, takeup leader 112 is routed along tape path 134 between the takeup reel 110 and a takeup leader catch 130 which holds the takeup leader 112 for connection and disconnection with the tape cartridge leader (not shown). FIG. 5 illustrates the prior art flow diagram of the guiding assembly operation during initialization, loading and unloading of magnetic tape media. Microprocessor 12, responsive to a user input signal to initialize tape drive 100, initiates operation of the tape head stepper motor (not shown) at step 200. The stepper motor drives gear 12, which rotates threaded post 16 in a counter-clockwise direction. As threaded post 16 rotates, tape head housing 20 moves vertically downward along threaded post 12, at step 202. As tape head housing 20 approaches the bottom of threaded post 12, cam bar 22 engages pin 14, at step 204. Pin 14 pivots cam bar 22 horizontally outward and away from tape head housing 20 at step 206. As cam bar 22 pivots outward, cam bar 22 contacts tape guide 30, pivoting tape guide 30 away from tape head housing 20 to the engaged position illustrated in FIG. 4, at step 208. One skilled in the art will appreciate that tape head housing 20, threaded post 16, cam bar 22 and tape guide 30 are configured so that tape head housing 20 reaches the lower limit of travel of threaded post 16 as tape guide 30 reaches engaged position.

Referring to the operational flow diagram of FIG. 6 in conjunction with FIG. 1, when tape guide 136 reaches its engaged position in step 208, tape path 134 is moved away from tape head 126 and additional takeup leader is pulled from takeup reel 110 in step 220. As takeup leader 112 moves in tape path 134, guide rollers rotate in step 222. The rotation of guide roller 116 in step 222 changes the tachometer count which is monitored by processor 122. In response to a change in the tachometer count in step 224, the processor discontinues stepping tape head 126 in step 226. In step 228, the tachometer count may be recorded for use as a reference for subsequent movement of tape head 126.

The present detection of a lower limit of tape head travel in a single reel tape drive overcomes the problem of overdriving the tape head housing when the tape drive is initialized. Utilization the components that are available within the tape drive provides a method for detecting the lower limit of travel without adding additional sensors or other components to solve the problem. Detection of the tape head assembly reaching the lower limit of travel allows the processor to discontinue movement of the tape head housing which in turn eliminates the buzzing from the stepper motor. Discontinuance of the stepping the tape head downward when the tape head has reached the lower limit of travel also reduces the wear on the stepper motor and the post and gear assembly.

While the present detection of a lower limit of tape head travel in a single reel tape drive as been illustrated and described with a tachometer coupled to a specific guide roller, another guide roller within the tape path may be substituted. Likewise, an alternative assembly may be utilized to move the tape media away from the tape head, thereby causing a rotation of the guide rollers which is monitored by the tachometer.

It is apparent that there has been described, a detection of a lower limit of tape head travel in a single reel tape drive that fully satisfies the objects, aims, and advantages set forth above. While the detection of a lower limit of tape head travel in a single reel tape drive has been described in conjunction with a specific embodiment thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A detection assembly for detecting when a tape head has reached a lower limit of travel, for use with a single reel tape drive embodying a tape guiding assembly and a tachometer coupled to a guide roller within a tape path and wherein a takeup leader is located within said tape path when said single reel tape drive is initialized, said detection assembly comprising:

a means for moving said tape head in a downward direction when said single reel tape drive is initialized;

a means for moving said tape guiding assembly away from said tape head when said tape head reaches said lower limit of travel, wherein moving said tape guiding assembly causes a movement of said takeup leader in said tape path;

a means for detecting said movement of said takeup leader within said tape path; and means, responsive to said detection of said movement of said takeup leader, for discontinuing said movement of said tape head in said downward direction.

2. The detection assembly of claim 1 wherein said means for moving said tape guiding assembly comprises:

a flipper located on a base of said tape head, wherein said flipper pivots between an initial position and an extended position; and a mechanical link located at said lower limit of travel for engaging said flipper and pivoting said flipper to said extended position, wherein as said flipper pivots toward said extended position said flipper engages said tape guiding assembly which moves said tape guiding assembly away from said tape head.

3. The detection assembly of claim 1 wherein said means for detecting comprises:

a tachometer, coupled to said guide roller within said tape path and responsive to movement of said takeup leader, for generating tachometer counts indicative of an extent of said movement.

4. The detection assembly of claim 3 wherein said means for detecting comprises:

a processing means responsive to said generated tachometer counts, for discontinuing downward movement of said tape head when a predetermined number of tachometer counts are detected.

5. The detection assembly of claim 4, wherein said processing means records a tachometer count when said processor discontinues movement of said tape head as a reference point, wherein said reference point is used for subsequent movement of said tape head.

6. A detection assembly for detecting a lower limit of travel for a tape head within a single reel tape drive when said single reel tape drive is initialized, the assembly comprising:

a means for stepping said tape head downward to said lower limit of travel when said single reel tape drive is initialized;

a tape guide connected within a tape path for guiding said tape path between an engaged position and a retracted position, wherein said engaged position moves said tape path away from said tape head;

a means for moving said tape guide between said retracted position and said engaged position, wherein when said single reel tape drive is initialized, a takeup leader connected to a takeup reel within said single reel tape drive and routed through said tape path moves to a secured position;

a tachometer, coupled to a guide roller within said tape path responsive to a movement of said takeup leader, for generating tachometer counts indicative of an extent of movement, wherein when said tape guide moves between said retracted position and said engaged position said takeup leader rotates said roller; and a processing means for monitoring said tachometer counts and in response to movement of said takeup leader indicative of said lower limit of said tape head, discontinues said downward stepping of said tape head.

7. The assembly of claim 6 wherein said tachometer count indicative of said lower limit is recorded by said processing means as a reference point wherein said reference point is used for subsequent movement of said tape head.

8. A method for detecting a lower limit of a movable tape head in a single reel tape drive embodying a tape guiding assembly when said tape drive is initialized, said movable tape head and said tape guiding assembly within a tape path and a takeup leader connected to a takeup reel within said single reel tape drive routes along said tape path, the method comprising:

stepping said movable tape head in a downward direction a number of steps;

moving said tape guiding assembly between a retracted position and an engaged position as said movable tape head reaches said lower limit, wherein said engaged position moves said tape guiding assembly and said takeup leader away from said movable tape head when said movable tape head reaches said lower limit;

monitoring a tachometer count of a tachometer which is coupled to a roller within said tape path while said movable tape head is stepped downward;

in response to a sufficient rotation of said roller coupled to said tachometer, discontinuing said stepping of said movable tape head in said downward direction.

9. The method of claim 8 wherein moving said tape guide comprises:

engaging a mechanical link, wherein as said movable tape head reaches said lower limit said mechanical link engages said tape guiding assembly for moving said tape guiding assembly to said engaged position.

10. The method of claim 8 further comprising:

recording said tachometer count indicative of said lower limit of said movable tape head as a reference point, wherein said reference point is used for subsequent movement of said movable tape head.

* * * * *